United States Patent [19]

Goren

[11] 4,179,209

[45] Dec. 18, 1979

[54] MULTICOLOR LINE SCREEN

[75] Inventor: Robert N. Goren, Rochester, N.Y.

[73] Assignee: Xerox Corporation, Stamford, Conn.

[21] Appl. No.: 821,455

[22] Filed: Aug. 3, 1977

[51] Int. Cl.[2] .......................... G03G 15/01; G03B 27/32

[52] U.S. Cl. .......................................... 355/3 P; 355/4; 355/32

[58] Field of Search ................ 96/1 PE, 1.3; 355/3 R, 355/3 P, 32, 35, 4; 204/299 PE, 300 PE

[56] References Cited

U.S. PATENT DOCUMENTS

| | | | |
|---|---|---|---|
| 3,085,878 | 4/1963 | Archer | 96/118 |
| 3,535,992 | 10/1970 | Goldmark et al. | 95/12.2 |
| 3,663,396 | 5/1972 | Gundlach | 204/300 PE X |
| 3,669,872 | 6/1972 | Tulagin | 204/300 PE X |
| 3,710,010 | 1/1973 | Balliett et al. | 178/5.4 R |
| 3,710,011 | 1/1973 | Altemus et al. | 178/5.4 R |
| 3,748,035 | 7/1973 | Mannik | 355/4 |
| 3,901,696 | 8/1975 | Mohn et al. | 355/3 P X |
| 3,967,897 | 7/1976 | Rogers | 355/32 |
| 3,986,772 | 10/1976 | Hermanson | 355/3 P |

*Primary Examiner*—Fred L. Braun

[57] ABSTRACT

In photoelectrophoretic imaging, a novel multicolor line or cross line filter element and method for maintaining color balance wherein the filter grid comprises a plurality of yellow, cyan and magenta color segments or their complementary colors of controlled varying widths for limiting color interaction in the resulting integrated image.

14 Claims, 4 Drawing Figures

MULTICOLOR LINE SCREEN

This invention relates to color control and correction and more specifically to maintaining color control and resulting color record in an electrophoretic imaging system.

BACKGROUND OF THE INVENTION

When utilizing photoelectrophoretic imaging technique, colored photosensitive particles are generally suspended in an insulating carrier liquid which is placed between a pair of electrodes are subjected to a potential difference while image-wise exposed. Ordinarily, in carrying out such a process, the imaging suspension is placed on a transparent electrically-conductive plate or electrode in the form of a thin film and light exposure is made through one transparent plate while a second electrode is placed or rolled across the top of the suspension. The ink particles normally bear an initial charge when suspended in the liquid carrier and are therefore first attracted to the transparent plate or base electrode. Upon exposure to a complementary color, however, the particles change polarities by exchanging charge (i.e. electrons) with the base electrode and resulting exposed charged particles then migrate away from the base electrode toward the second electrode, thereby forming complementary images on both electrodes by particle subtraction. For example, yellow pigments selectively absorb blue light, magenta pigments absorb green light, and cyan pigments substantially selectively absorb red light. When a mixture comprising cyan, magenta and yellow particles is image-wise exposed to yellow light, therefore, the cyan and magenta particles become charged and migrate, leaving behind a positive image consisting essentially of yellow particles. Similarly, when a polychromic ink is exposed to a multicolored image, different colored particles absorb light of their complementary color and migrate, leaving behind a full colored positive image on an electrode corresponding to the original multicolored image. An extensive and detailed description of photoelectrophoretic imaging techniques and principles can be found, for instance, in U.S. Pat. Nos. 3,383,993, 3,384,488, 3,384,565 and 3,384,566, and in "Principles of Color Photography" by Hanson et al on page 443.

As noted in or ascertained from the art, the use of mixtures of migrating color particles for photoelectrophoretic imaging purposes is a logical and very practical way of avoiding the expensive and time-consuming conventional processes.

Despite this fact, however, there remains room for improvement both with respect to color balance, stability and tonal response of multi-colored photoelectrophoretic records. In fact, some desirable characteristics appear to be antagonistic, such that a trade off of desirable and undesirable characteristics sometimes becomes necessary in formulating photoelectrophoretic links. For example, exposed magenta ink particles sometimes "charge exchange" or transfer charges to unexposed yellow, cyan, or other magenta particles causing serious errors in electrophoretic response. In addition, there is a tendency for some magenta pigments to absorb both blue and green light. Similar problems can also arise with respect to cyan- and yellow-pigmented ink particles. In addition, the exposure latitude or dynamic range of the colors may be mismatched or insufficient for good color performance. In combination such problems often force the use of less favored ink dyes or pigments to the detriment of overall tonal response.

Clearly, without good control over the "charge exchange" and other problems of the above type, it is very difficult to obtain and preserve high quality color records by using a photoelectrophoretic system.

It is an object of the present invention to improve the flexibility, quality and stability of polychromic photoelectrophoretic images.

It is a further object of the present invention to increase flexibility by broadening the spectrum of color particles, particularly the choice of dyes and pigments which can be utilized for photoelectrophoretic purposes.

It is a still further object of the present invention to improve color record stability and to minimize the interaction (chemical, electrical, and optical) between the classes of color particles utilized in photoelectrophoretic inks.

THE INVENTION

The above objects are achieved in accordance with the present invention in which a polychromic photoelectrophoretic image is obtained by image-wise exposing an imaging device comprising blocking and injecting electrodes and an intermediate polychromic photoelectrophoretic ink while in register, in the presence of at least one electric field across the ink layer at an imaging station, the improvement comprising imposing a light filtering lattice between the image source and applied photoelectrophoretic ink.

The present invention is also inclusive of a photoelectrophoretic imaging device comprising, in combination, a blocking electrode; an injecting electrode; inking means for applying a layer of a mono- or polychromic photoelectrophoretic ink onto the injecting electrode; an imaging station wherein the blocking and injecting electrodes and applied ink are image-wise exposed, while in register, to a light pattern or image; means for applying an electric field across the ink layer at least during image-wise exposure; and a light-filtering lattice arranged at the imaging station between the light pattern source and applied ink layer, said light filtering lattice being geometrically subdivided into a large plurality of specific alternately arranged light-transmitting cells of at least three different colors, inclusive of red, green, blue and corresponding complementary colors, to effectively trigger migration and orientation of particles of corresponding color within the electrode applied photoelectrophoretic ink, thereby forming positive and negative images on the respective electrodes as a plurality of separate but closely proximate loci corresponding respectively to at least each cell of the filtering lattice upon which a light pattern impinges during image exposure.

It is further assumed, for purposes of defining the present invention that one of ordinary skill is well aware of common terms commonly used in conjunction with photoelectrophoretic imaging systems. For example, the term "injecting electrode" is understood to refer to the element designed to optimize charge exchange with activated photosensitive particles in the ink during imaging.

The term "suspension" is intended to refer to ink particles which, after being initially attracted to the injecting electrode, are capable of altering their polarity and migrating away from the electrode under the influence of an external applied electric field when exposed to an activating electromagnetic radiation.

The term "suspension" is also understood to be a system having solid particles dispersed in a solid, liquid or gas, and preferably, a solid suspended in a liquid carrier.

The term "blocking" or "imaging" electrodes on the other hand, is used to describe that electrode which interacts with the injecting electrode through the suspension and which once contacted by activated photosensitive particles will minimize charge exchange with the particles.

The concept as above defined includes various possible arrangements such as incorporating the light-filtering lattice into or as part of a light-permeable electrode, preferably an injecting electrode or in the form of a light-permeable plate, strip, belt, or web at least temporarily interposed between and in register with the light pattern source and light-permeable injecting electrode during imaging. For such purposes at least one of the blocking and injecting electrodes can be conveniently in the form of a web, drum, or plate.

For purposes of the present invention, the light-filtering lattice can also usefully comprise a fine grid or screen of alternately arranged colored lines, dots, squares or combination thereof, the sum total of such light transmitting or filtering areas, however, can be usefully of equal or unequal area, depending upon the specificity of the light-transmitting and absorption characteristics of the dyes or pigments utilized in the filter lattice and the responsiveness of the ink particles to light transmitted through the lattice. Generally speaking, the relative area of the lattice cells and the choice of photoelectrophoretic ink is based on the fact that in the reproduced image, the resultant red density is usually due to the cyan and relatively little contribution is made by the magenta and the yellow components. The green density, however, is found not to be due exclusively to the magenta component but also to substantial contribution from the cyan component as well as a small contribution from the yellow. The situation with respect to blue is also confused by the fact that approximately half of the blue record is generally attributable to light-absorption characteristics of the complementary yellow pigment and the other half is due to blue absorption on the part of cyan and magneta components.

The effect resulting from using imperfect pigments or dyes is primarily seen, however, in the greens, which are generally deficient in yellow, and appear somewhat blue or blue-green. In addition, they are secondarily manifest in de-saturation of the blues, cyans and yellows, as well as in an overall increase of neutral density of the reproduced color picture.

Referring to each combination of color cells (i.e. red, blue, green or yellow, cyan, magenta) as a "period" it is found useful if individual light absorbing areas of filter lattices of the present invention include from 20–50% by area, the remaining 80–50% being equally or otherwise divided as found convenient among the remaining cells. Generally, however, such cells will vary from about 20–200 μ in width, the preferred planar distance between the filter lattice and the applied ink being a function of the period, the imaging lens $f$ number, and the magnification as known and practiced in conventional half tone screening art.

DETAILED DESCRIPTION OF THE INVENTION

Figure 1:
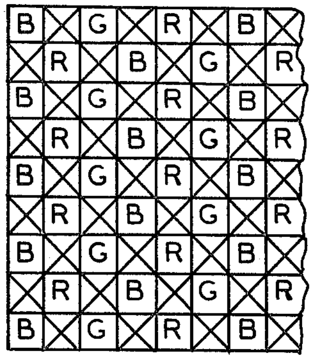
FIG. 1 is a broken, magnified, schematic view of one form of the light filter of this invention.
Figure 2:
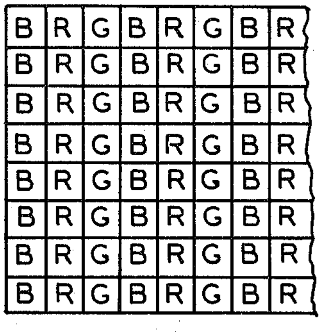
FIG. 2 is a broken, magnified, schematic view of another form of the light filter of this invention.
Figure 3:
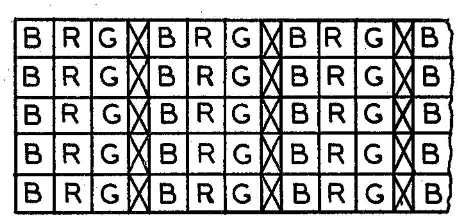
FIG. 3 is a broken, magnified, schematic view of yet another form of the light filter of this invention.

Further explanation and disclosure of the present invention is found in connection with the attached drawings and explanation thereof, FIGS. 1–3 representing broken magnified schematic top view of suitable filter lattices in the form of screens having square-shaped cells arranged in rows and columns, in which the letter (R) represents red-, (B) represents blue-, and (G) represents green-, transmitting or- absorbing materials, a substantial part of the corresponding complementary colors being transmitted through the cell as indicated above.

In FIGS. 1 and 3 are also found cells identified by the letter "X" which signifies material capable of reflecting or absorbing substantially all light to which the ink particles are "photosensitive" within the above definition. Such cells should have an area not less than about 1/10 of nearby colored cells.

Particularly preferred, for purposes of the present invention, are triangular lattice arrangements in which the red, blue and green cell areas arranged in the manner of FIGS. 1 and 3 it being understood that the complementary colors are equally appropos', and the areas of total absorption or reflectance (i.e. "X") are properly included in proximity in order to isolate complementary dyes to avoid reactions or synergistic effects between color components in the final record. Such buffer zones are satisfactorily obtained by the use of a combination of dyes or by utilizing other opaque materials, the shape and size being generally comparable to other filter cells but optimally of smaller area, depending upon the width and cross sectional dimensions of the colored cells.

Figure 4:
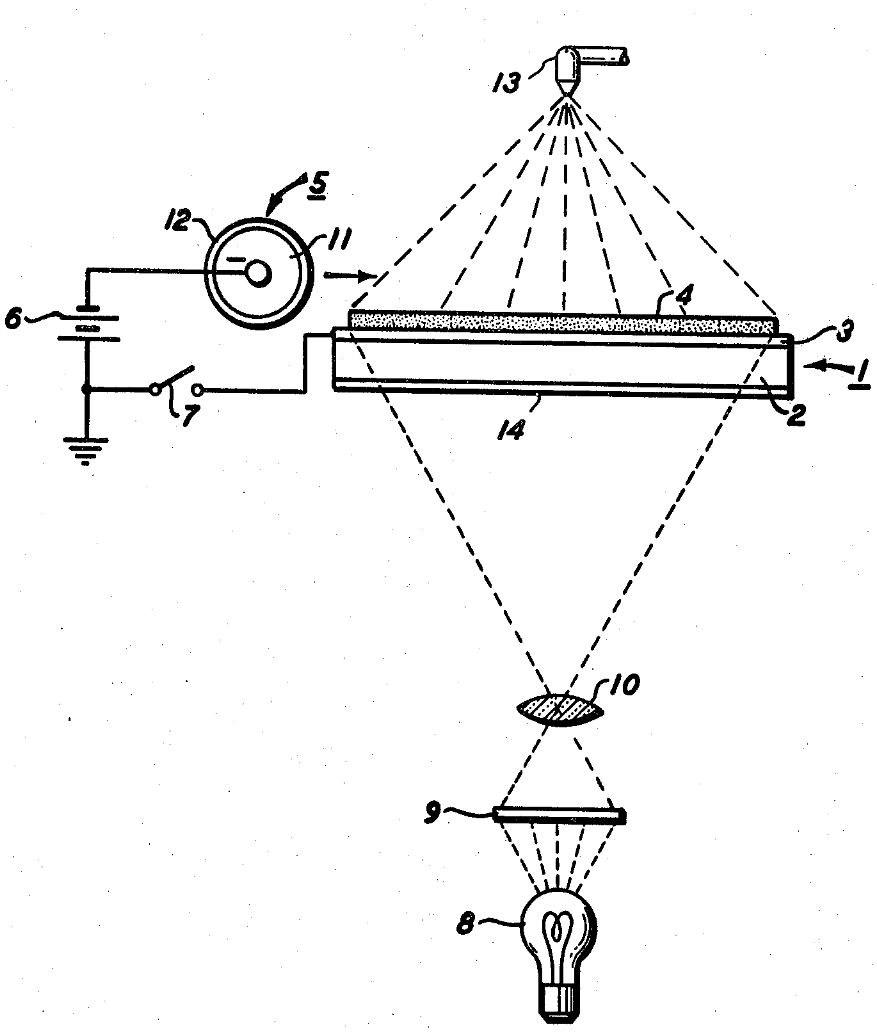
FIG. 4 is a side view of a simple exemplary system for carrying out the invention.

In FIG. 4, there is shown a photoelectrophoretic imaging apparatus wherein the light filtering lattice of this invention is utilized. In FIG. 4, there is shown injecting electrode 1 comprising a transparent substrate 2 and a transparent thin coating of an electrically conductive material 3. Electrode 1 is conveniently provided by utilizing a glass electrode sold under the tradename NESA ® by the Pittsburgh Plate Glass Company. On injecting electrode 1, there is coated a layer of mono or polychromic photoelectrophoretic ink 4 in contact with the conductive layer 3. Inking means 13 supplies the photoelectrophoretic ink to electrode 1 by means of a spray nozzle appropriately positioned to uniformly cover electrode 1. Once coated with the photoelectrophoretic ink, blocking electrode 5 comprising a conductive core 11 and an electrically insulating outer layer 12 is rolled across the electrically conductive layer 3. Power supply 6 is utilized to supply an electrical field between conductive layer 3 and conductive core 11 through switch 7. With the field applied, the blocking electrode is rolled across the imaging suspension while it is exposed to an imagewise pattern of light. The light is supplied by light source 8 which is typically an incandescent light projecting image 9 through lens 10 onto the ink layer 4. Positioned between lens 10 and ink layer 4 there is placed light filtering lattice 14 which may alternatively be a light filtering lattice as described in FIGS. 1, 2 and 3.

Suitable materials for purposes within the scope of the present invention can consist of known light filter material or combinations of filter material (i.e. dyes), through the use of photo engraving, etching, silk screen printing, masking or other known techniques for applying or impregnating a design onto a substrate such as an electrode or other receptive surface.

Receptive surfaces for lattice filter purposes within the present invention can include, for instance, a NESA glass electrode itself or a separate polymeric film overlaying the top of the light permeable electrode such as cellophane.

Insofar as the active filter material itself, is concerned, it is found convenient to use commercial filter material such as found in Kodak wratten filter #32 (magenta) or #61 (green) or similar (65A) filters, provided that they are sufficiently stable and reasonably precise with respect to absorption spectra. This type filter material can be found listed, for instance, in U.S. Pat. No. 3,477,922, including but not limited to trimixes of conventional dyes such as Watchung Red, Monolite Fast Blue and "96" yellow, etc. (ref. U.S. Pat. Nos. 3,922,169, 3,923,506, 3,953,462, 3,957,829 and 4,017,311.

It is preferred for purposes of the present invention that the injecting electrode be composed of an optically transparent material such as glass overcoated with a conductive material such as tin oxide, copper, copper iodide, gold or like material, in order to obtain optimum results; however other suitable materials including many semiconductor materials such as raw cellophane, which are ordinarily not thought of as conductors but which are still capable of accepting injecting charge carriers of the proper polarity under the influence of the applied field, may be used within the course of the present invention. The use of more conducting materials, however, allows for a cleaner charge separation and prevents possible charge build up on the electrode which would tend to diminish the interior electrode field. The blocking electrode on the other hand is selected so as to prevent or greatly retard the injection of electrons into the photosensitive pigment particles when the particles reach the surface of this electrode. The blocking electrode base generally will consist of a material which is fairly high in electrical conductivity. Typical conductive materials are conductive rubber and metal foils, such as steel, aluminum, copper, and brass. Preferably the core of the blocking electrode will have a high electrical conductivity in order to establish the desired polarity differential. However, if a low conductivity material is used a separate electrical connection may be made to the back of the blocking layer of the electrode. It is preferred that the blocking layer, when used, be an insulator or a semiconductor which will not allow for the passage of sufficient charge carriers under the influence of an applied field to discharge the particles bound to its surface, thereby preventing particle oscillation within the system. Although the blocking electrode does allow for passage of some charge carriers it still would be considered to come within the class of preferred materials if it does not allow for the passage of sufficient charge carriers to recharge the particles to the opposite polarity. Exemplary of other types of blocking layer material used are baryta paper, which consists of paper coated with barium sulfate suspended in a gelatin solution, or Tedlar, a polyvinyl fluoride and polyurethane. Where blocking layers are used, any other suitable material having a resistivity of from about $10^7$ ohm-cm. or greater may be employed as the blocking electrode material. Typical materials in this resistivity range include cellulose acetate coated papers, polystyrene, polytetrafluoroethylene, and polyethyleneteraphthalate. The baryta paper, Tedlar and other materials used as the blocking layer may be wetted on the back surface with tap water or coated with an electrically conductive material. The blocking electrode layer, when utilized, may be a separate replaceable layer which is either taped to the blocking electrode core, or held by a suitable device such as mechanical fasteners which are capable of simply holding the layer on the electrode. In the alternative, the layer may be an integral part of the electrode itself, being either adhesively bonded, laminated, spray coated or otherwise applied to the surface of the electrode core.

As previously noted, blocking and injecting electrodes suitable for purposes of the present invention can be in the form of plates, webs, drums or combinations thereof as disclosed in the Art. Suitable photoelectrophoretic devices and arrangements thereof can be found, for instance, in U.S. Pat. Nos. 3,384,565, 3,383,993, 3,384,488, 3,384,565, 3,384,566, 3,510,419, 2,588,699, 2,777,957, 2,885,556 and 2,297,691, which are here incorporated by reference.

Suitable photoelectrophoretic ink components for the present purposes are inclusive of organic and inorganic pigments and dyes such as phthalocyanines, cadmium sulfide, Lewis Acids, etc. provided they are electron acceptors. Such compounds are listed by way of example in columns 3-8 of U.S. Pat. No. 3,510,419 in 3,384,488 and in the examples of U.S. Pat. No. 3,384,565. Such inks are inclusive of polymeric components.

It is desirable to use pigment particles which are relatively small in size because smaller particles produce better and more stable pigment dispersions in the liquid carrier and in addition are capable of producing images of greater covering power and higher resolution than would be possible with particles of larger sizes. Even where the pigments are commercially not available in small particle sizes the particle size may be reduced by conventional techniques such as ball milling or the like. When the particles are suspended in the liquid carrier they may take on a net electrostatic charge so that they may be attracted towards one of the electrodes in the system depending upon the polarity of the charge with respect to that of the electrode. It is not necessary that the particles take on only one polarity of charge but instead the particles may be attracted to both electrodes. Some of the particles in the suspension initially move towards the injecting electrode while others move towards the blocking electrode with this type of system; however, this particle migration takes place uniformly over the entire area covered by the two electrodes and the effect of imagewise, exposure-induced migration is superimposed thereon. Thus, the apparent bipolarity of these suspensions in no way effects the imaging capability of the system except for the fact that it subtracts some of the particles uniformly from the system before imagewise modulation of the particle migration takes place.

A number of suitable insulating carrier liquid may be used in the course of the present invention. Typical materials include, for instance, decane, dodecane, and tetradecane, molten paraffin wax, molten beeswax, and other molten thermoplastic materials, mineral oil, Sohio Odorless Solvent, a kerosene fraction commercially available from Standard Oil Company of Ohio and Isopar G, a long chain saturated aliphatic hydrocarbon commercially available from the Humble Oil company of New Jersey and mixtures thereof.

The percentage of pigment in the insulating liquid carrier is not considered critical, however, for it is noted that from about 2 to about 15 percent pigment by weight of the suspension has generally been found adequate for photoelectrophoretic imaging purposes.

Light sources for such polychrome systems have, until the present time, been of either the continuous spectrum kind, typified by tungsten iodide lamps and conventional tungsten lamps, or various line spectrum light sources, typified by mercury lithium lamps. The line spectrum lamps with the lines or line groups for red, green and blue will generate images of good quality. However, for optimum working conditions line spectrum lamps require expensive power supplies, elaborate controls, precision cooling systems, and other complex and costly devices in order to keep the light output constant. Continuous spectrum light sources are less complex and costly; however, the light which they emit is not ideal for the production of high quality polychromatic images. In an attempt to correct the deficiencies of the continuous light sources it has been found necessary to bias them by means of various color correction filters and to reduce illumination from certain radiation bands to zero, for example, by using didinium, infrared, or ultraviolet filters. However, even with these precautions it has not been possible before the present invention to equal the color quality of the line spectrum light sources in a polychromatic process.

The following examples are illustrative of preferred embodiments but not limitative of the scope of the invention as set out above.

All of the following examples are carried out with a photoelectrophoretic imaging device consisting of a flat NESA glass injecting electrode having coated thereon a thin layer of finely divided photosensitive particles dispersed in an insulating carrier. A light source, transparent original and lens system are positioned beneath the injecting electrode and a cellophane film (i.e. the filter lattice) with a pattern of red, green and blue dyes printed thereon is affixed to the bank of the NESA injecting electrode. The blocking electrode is cylindrically shaped and adapted for passage over the inked injecting electrode during simultaneous light exposure and activation of both electrodes. The general structure and working parameters are identical with those found, for instance, in FIG. 1A and in Columns 2–7 of U.S. Pat. No. 3,384,565, except for the presence of a filter lattice as described.

EXAMPLE I

A tri-mix photoelectrophoretic ink suspension is prepared by combining equal amounts of the following:

(A) Bonodur Red B dispersed in mineral oil (4 gm/100 ml) and 0.8 gm purified powdered polyethylene DYLT from Union Carbide Corporation admixed with heating to about 100° C. and then cooled to form one of the color components of the tri-mix ink.

(B) Metal-free alpha phthalocyanine is similarly suspended with polymer as in (A) (at 3.5 gm/100 ml) and then cooled.

(C) 5 gm N-2″-pyridyl-8,13-dioxodinaphtho-(2,1-d; 2′3-3)-furan-6-carboxamide is dissolved in 100 ml Sohio Odorless Solvent 3440 at 15° C.

Components (A) and (B) and (C) are combined to form a black imaging suspension. The suspension is then applied thinly (1 mil) onto a NESA glass electrode and a blocking electrode carrying a Tedlar film on its surface as a blocking layer is rolled over the imaging suspension under a 2000 volt applied potential while exposed to a full-color image. A low density optically positive image having poor tonal response is obtained on the NESA electrode and a corresponding optically negative image obtained on the blocking electrode.

Two images identified as T-1 and T-2 are made in the above manner and evaluated before and after 15 days storage in an oven maintained at 85° C. and 95% relative humidity with respect to tonal response and the results reported in Table I.

EXAMPLE II

Example I is twice repeated except that a fine line cellophane filter subdivided in the manner diagrammed in FIG. 1 with equal sized red, green, blue and opaque (X) cells of about 20μ on a side is interposed between the NESA electrode and the light image source. Following simultaneous exposure and excitation positive color images identified as T-3 and T-4 are obtained and examined both before and after storage as in Example I. The results are reported in Table I.

EXAMPLE III

Example II is twice repeated except that a fine line cellophane filter or screen subdivided as in FIG. I but without color filter cells is interposed between the NESA electrode and the light image source. Following simultaneous exposure and excitation as before, positive color images identified as T-5 and T-6 are obtained, examined and treated as before, the results being reported in Table I.

TABLE I

| Sample | Tonal Response Before Storage | Tonal Response After Storage | Color Balance |
|---|---|---|---|
| T-1 | Poor | Poor | Fair |
| T-2 | Fair | Fair | Fair |
| T-3 | Very Good | Very Good | Excellent |
| T-4 | Excellent | Very good | Excellent |
| T-5 | Very Good | Very Good | Good |
| T-6 | Very Good | Very Good | Good |

What is claimed is:

1. In a photoelectrophoretic imaging device comprising in combination a blocking electrode;

an injecting electrode;

inking means for applying a layer of a mono or polychromic photoelectrophoretic ink onto the injection electrode;

an imaging station wherein the blocking and injecting electrodes and applied ink are image-wise exposed, while in register, to a light pattern or image;

means for applying an electric field across the ink layer at least during image-wise exposure;

the improvement comprising a light filtering lattice arranged at the imaging station between the image-wise light pattern and the applied ink layer, said light filtering lattice being geometrically subdivided into repetitive areas of individual light reflective cells of at least three different colors, inclusive of red, green, blue and corresponding complementary colors, thereby forming positive and negative images on the respective electrodes as a plurality of separate but closely proximate loci corresponding to at least each cell of the filter lattice.

2. The imaging device of claim 1, wherein the light filtering lattice is incorporated into a light-permeable electrode.

3. The imaging device of claim 1, wherein the light-filtering lattice is applied as a light-permeable plate, strip, belt or web at least temporarily interposed between and in register with the light pattern source and light-permeable injecting electrode during imaging.

4. The imaging device of claim 2 wherein the light filtering lattice comprises a fine grid or screen of alternately arranged colored lines, dots, squares, or combination thereof.

5. The imaging device of claim 3, wherein the light filtering lattice contains one or more fine grids or screens of alternately colored lines, dots, or squares or combination thereof.

6. The imaging device of claim 1, wherein at least one of the blocking and injecting electrodes is in the form of a web, drum or plate.

7. The imaging device of claim 2 wherein at least one of the blocking and injecting electrodes is in the form of a web, drum, or plate.

8. The imaging device of claim 3 wherein at least one of the blocking and injecting electrodes is in the form of a web, drum or plate.

9. The imaging device of claim 4 wherein one or more of red, blue and green light-reflecting cells within the light-filtering lattice are of unequal area.

10. The imaging device of claim 4 wherein one or more of cyan, yellow and magenta light-reflecting cells or their complementary colors within the light-filtering lattice are of unequal area.

11. In a method for improving flexibility, quality and stability of polychromic photoelectrophoretic images obtained by image-wise exposing an imaging device comprising blocking and injecting electrodes and an intermediate polychromic photoelectrophoretic ink while in register in the presence of at least one electric field across the ink layer at an imaging station, the improvement comprising imposing a light filtering lattice as defined in claim 1 between the image source and the applied photoelectrophoretic ink.

12. A method for improving the quality and stability of polychromic photoelectrophoretic images utilizing a photoelectrophoretic imaging device, comprising imposing a light filtering lattice as defined in claim 2 between the image source and applied photoelectrophoretic ink.

13. A method for improving the quality and stability of polychromic photoelectrophoretic images utilizing a photoelectrophoretic imaging device, comprising imposing a light filtering lattice as defined in claim 4 between the image source and applied photoelectrophoretic ink.

14. A method for improving the quality and stability of polychromic photoelectrophoretic images utilizing a photoelectrophoretic imaging device, comprising imposing a light filtering lattice as defined in claim 10 between the image source and applied photoelectrophoretic ink.

* * * * *